(12) United States Patent
Becker et al.

(10) Patent No.: US 6,195,085 B1
(45) Date of Patent: Feb. 27, 2001

(54) APPARATUS IN A COMPUTER SYSTEM FOR PLIANT ERGONOMIC POINTING DEVICE

(75) Inventors: Craig Henry Becker, Austin, TX (US); Michael David Hocker, Staatsburg, NY (US); Gregory Tad Kishi, Oro Valley, AZ (US); James Gordon McLean, Fuquay-Varina, NC (US); Clifford Alan Pickover, Yorktown Heights, NY (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/056,255

(22) Filed: Apr. 7, 1998

(51) Int. Cl.$^7$ .................................................. G09G 5/08
(52) U.S. Cl. ........................................... 345/163; 248/918
(58) Field of Search ............................ 345/163; 248/118, 248/918

(56) References Cited

U.S. PATENT DOCUMENTS

| | | | | |
|---|---|---|---|---|
| 3,647,279 | * | 3/1972 | Sharpless et al. | 350/160 |
| 5,678,266 | * | 10/1997 | Petringa et al. | 5/655.5 |
| 5,721,059 | * | 2/1998 | Kito et al. | 428/522 |
| 5,731,807 | * | 3/1998 | Feierbach | 345/163 |
| 6,016,138 | * | 1/2000 | Harskamp et al. | 345/163 |

FOREIGN PATENT DOCUMENTS 0 775 961 A1 * 2/1996 (EP) ................................ G06F/17/00

* cited by examiner

*Primary Examiner*—Steven J. Saras
*Assistant Examiner*—William C. Spencer
(74) *Attorney, Agent, or Firm*—Robert M. Sullivan; Felsman, Bradley, Vaden, Gunter & Dillon, LLP (57) ABSTRACT

A hand held pointing device for use with a computer system having a graphic interface. The pointing device includes a body, and a communications device within the body for communicating movement signals to the computer system. The pointing device further includes a movement detection device within the body, coupled to the communications device, for detecting movement of the body by a computer user. The pointing device additionally includes a pliant outer shell having at least a portion of the body which dynamically conforms to a computer user's hand when the pointing device is held and manipulated by a computer user, such that the portion of the body which conforms to the computer user's hand provides comfort and efficient ergonomic cushioning to the computer user during computer system pointing device activities. The pointing device further includes at least one user input device for transferring data to the computer system via the pointing device. In addition, the pointing device includes an interior shell which prevents the portion of the body from contacting interior electronics located within the pointing device. The pliant outer shell may also be surrounded by a membrane for preventing the rupture of the portion of the body. The pliant outer shell portion of the body may be composed of a gel based on an elastomer compound. Liquid-crystal material, controlled by a host computer, can also be located on the exterior of the pointing device to provide visual feedback to the computer user.

16 Claims, 6 Drawing Sheets

APPARATUS IN A COMPUTER SYSTEM FOR PLIANT ERGONOMIC POINTING DEVICE

BACKGROUND OF THE INVENTION

1. Technical Field

The present invention relates to an improved information-retrieval apparatus. In particular, the present invention relates to an improved information-retrieval apparatus utilized in association with graphical user interfaces. More particularly, the present invention relates to computer input devices such as computer pointing devices. Still more particularly, the present invention relates to ergonomic pointing devices that may be utilized to manipulate and retrieve information displayed within a graphical user interface.

2. Description of the Related Art

A graphical user interface is a type of display format which enables a user to choose commands, start programs, and see lists of files and other options by pointing to pictorial representations and lists of menu items on a computer display screen. Choices can generally be activated by either a keyboard or a pointing device. A pointing device is a type of input device utilized to control on-screen cursor actions such as "pressing" on-screen buttons, and selecting ranges of cells in spreadsheets or groups of words in a document. Pointing devices are often utilized to create drawings or graphical shapes. The most commonly utilized pointing device known today is a "mouse."

A mouse is a commonly utilized pointing device, containing one or more buttons, that allows a user to interact with a product or operating environment such as a graphical user interface. A mouse typically includes a casing with a flat bottom. The mouse is designed to be gripped by one hand, and includes one or more buttons on the top of the mouse and a multidirectional detection device, usually shaped like a ball, on the bottom of the mouse. A cable usually connects the mouse to a computer. By moving the mouse on a surface such as a desk or mouse pad, a user can control an on-screen cursor. Because there are no defined limits to the mouse's movement and because the placement of the mouse on a surface does not map directly to a specific screen location, the mouse is considered to be a relative pointing device. Thus, to select items or choose commands on the screen, the user presses one of the mouse's buttons, producing a so-called mouse "click."

The user can interact with on-screen graphical elements via the mouse. The mouse controls a mouse pointer, which is a type of on-screen graphical element utilized by the mouse. The mouse pointer is displayed on a computer monitor screen such that its location on-screen changes as the user moves the mouse. Depending on the location of the mouse pointer and the operation of the program (i.e., the graphical user interface within which the mouse pointer is displayed), the area of the screen where the mouse pointer appears serves as the target for an action when the user presses one of the mouse buttons.

Some conventional graphical user interfaces provide a cursor and scroll bar for scrolling through portions of a viewable object. A viewable object can contain multiple components such as spreadsheets, text, hotlinks, pictures, sound, and video object. However, a viewable object is not limited to these components. In many types of graphical user interfaces, a vertical or horizontal bar at the side or bottom of a graphical user interface window can be utilized in conjunction with the mouse to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

In utilizing a mouse to interact with a graphical user interface via mouse pointers and viewable objects, users often have difficulty interacting with such pointing device due to physical limitations or the size or construction of the pointing device itself. A mouse can be uncomfortable to a user based on both its shape and construction. Long hours spent with an uncomfortable mouse may lead to the development of wrist and hand problems.

In attempting to mitigate these potential problems associated with such pointing devices, scientists and engineers have attempted to apply ergonomic techniques and principals. Ergonomics is the application of biological and engineering data to the design of systems, programs, and devices in order to adapt them to human requirements, to the tasks they are to perform, and to the environments in which they are to be used. Human factors should be considered in designing such pointing devices. Human factors are the characteristics, limitations, physical requirements and psychological needs of people that must be considered in designing and developing systems, programs, and devices that can be utilized easily and which are appropriate for the tasks and working environment for which they are intended.

Designers have attempted to construct and create new pointing devices with such ergonomic and human factors in mind. However, to date, most designs have focused on redesigning the rigid shape of such pointing devices or providing peripheral devices utilized in association with such pointing devices (e.g., wrist support mechanisms, and so forth). In all of these instances, the user must essentially conform to the restraints of the given pointing device and not vice-versa. To date, no designs have been created or implemented which actually attempt to physically conform the pointing device to the anatomy of the user. By conforming the pointing device to the physical attributes of a given user, increased comfort and efficiency in using a pointing device is an immediate result. Thus, it can be appreciated that a need exists for a pointing device which is safe, comfortable, easy to use, and which is infinitely adaptable to the physical variations evidenced by the diverse computer users of today. The invention disclosed herein addresses and solves this need.

SUMMARY OF THE INVENTION

It is therefore an object of the invention to provide an improved information-retrieval apparatus.

It is another object of the invention to provide an improved information-retrieval apparatus utilized in association with a graphical user interface.

It is still another object of the invention to provide improved computer input devices, such as computer pointing devices.

It is yet another object of the invention to provide an improved ergonomic pointing device that may be utilized to manipulate and retrieve information displayed within a graphical user interface.

The above and other objects are achieved as is now described. A hand held pointing device is disclosed for use with a computer system having a graphic interface. The pointing device includes a body, and a communications device within the body for communicating movement signals to the computer system. The pointing device further includes a movement detection device within the body, coupled to the communications device, for detecting movement of the body by a computer user. The pointing device additionally includes a pliant outer shell having at least a portion of the body which dynamically conforms to a computer user's hand when the pointing device is held and manipulated by a computer user, such that the portion of the body which conforms to the computer user's hand provides comfort and efficient ergonomic cushioning to the computer user during computer system pointing device activities. The pointing device further includes at least one user input device for transferring data to the computer system via the pointing device. In addition, the pointing device includes an interior shell which prevents the portion of the body from contacting interior electronics located within the pointing device. The pliant outer shell may also be surrounded by a membrane for preventing the rupture of the portion of the body. The pliant outer shell portion of the body may be composed of a gel based on an elastomer compound. Liquid-crystal material, controlled by a host computer, can also be located on the exterior of the pointing device or beneath a transparent protective layer to provide visual feedback to the computer user.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
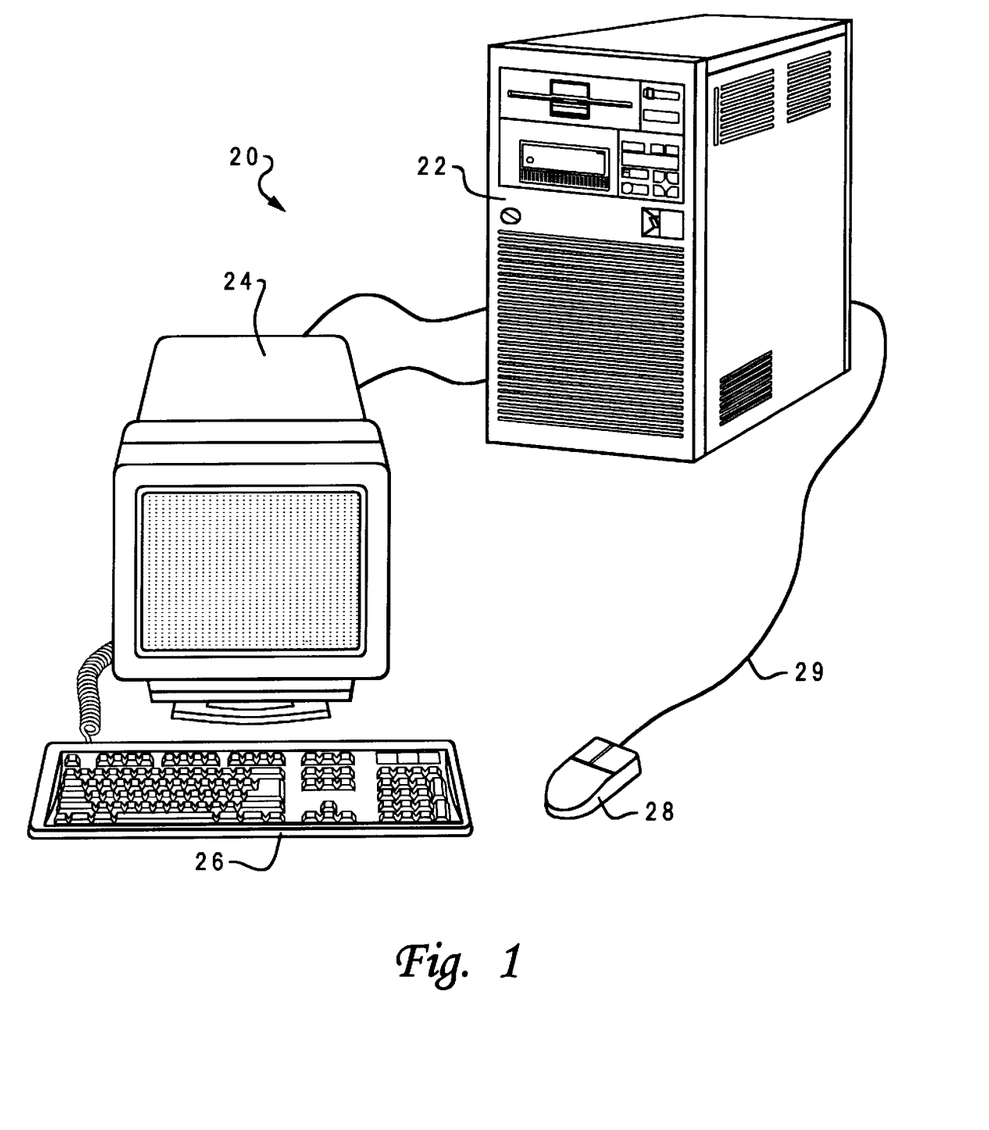
FIG. 1 is a pictorial representation of a data-processing system which can be utilized to implement the apparatus of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer, such as the IBM Aptiva™. The AS/400 computer system, the IBM SYSTEM RISC/6000, and the IBM Aptiva™ are products of International Business Machines Corporation, located in Armonk, N.Y.

Although the depicted embodiment involves a personal computer, a preferred embodiment of the present invention can be implemented in other types of data-processing systems, such as, for example, intelligent workstations, portable computers, or mini-computers. Computer system 20 includes a graphical user interface (i.e., also referred to as a "graphic interface") that resides within a machine-readable media to direct the operation of computer system 20. Those skilled in the art will appreciate that the present invention applies equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g., a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click."

Figure 3:
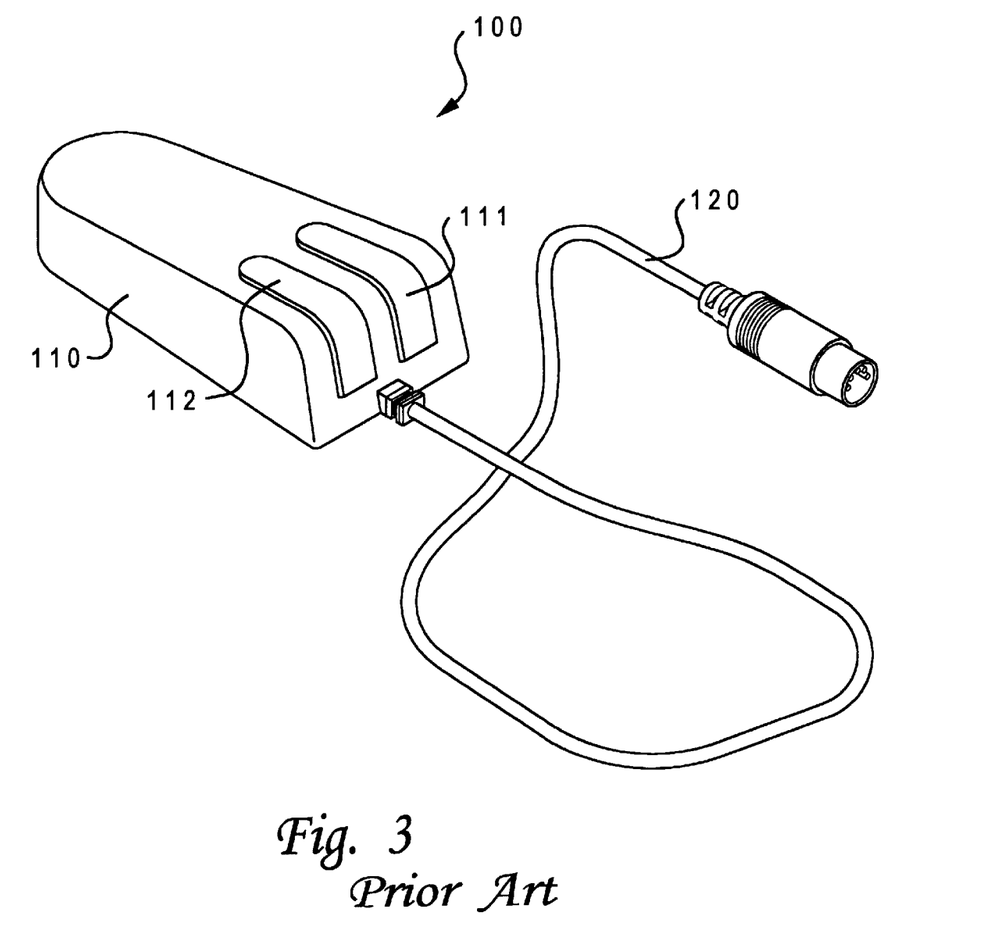
FIG. 3 illustrates a pictorial representation of a prior art computer mouse.

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 28 is described as a pointing device which may be utilized in accordance with a preferred embodiment of the present invention, those skilled in the art will appreciate that other pointing devices, such as the IBM TrackPoint II™, can also be utilized in association with a preferred embodiment of the present invention. An example of a prior art mouse is depicted in FIG. 3 herein.

Figure 2:
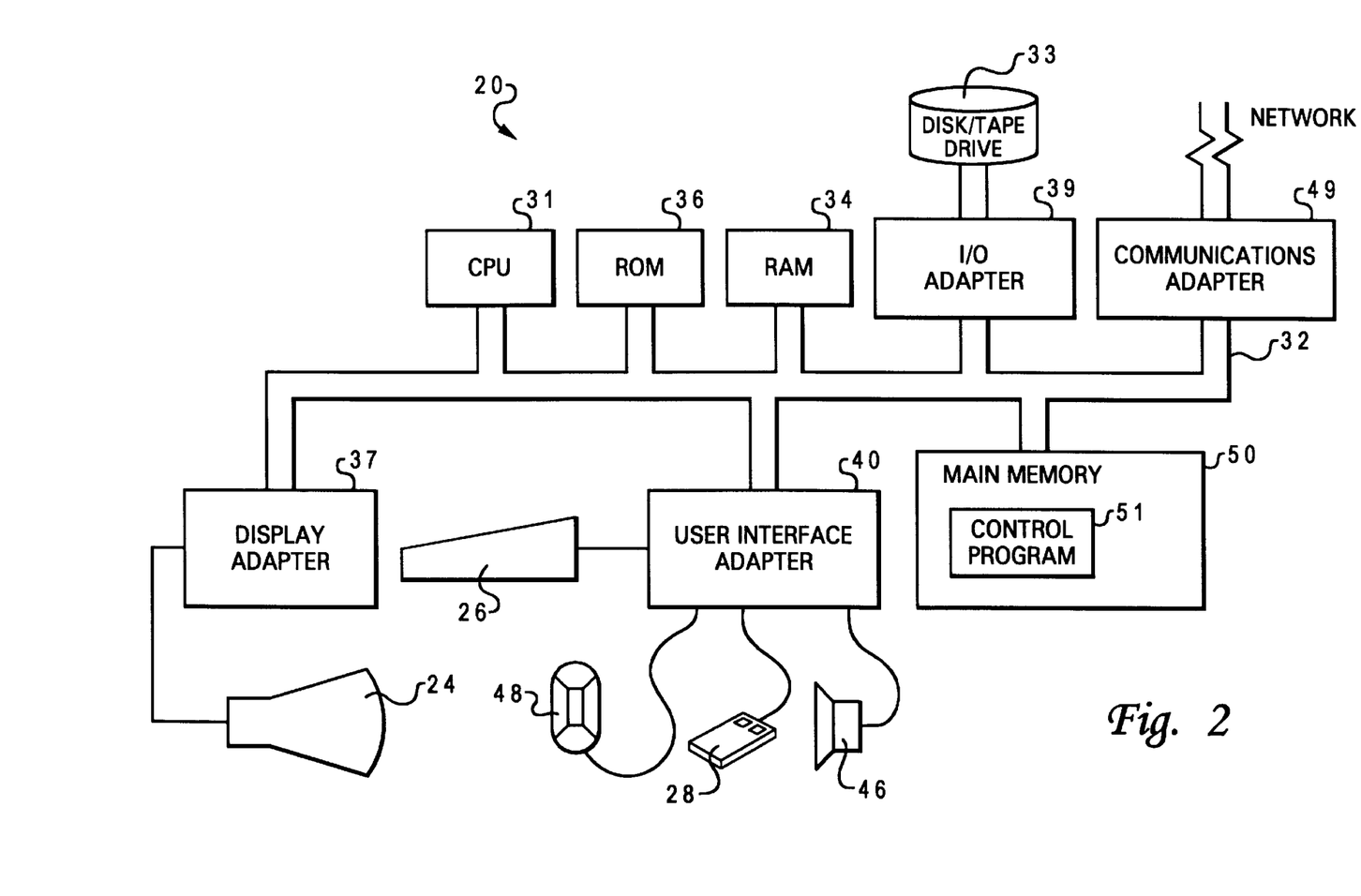
FIG. 2 depicts a representative hardware environment of a computer system in accordance with a preferred embodiment of the present invention.

FIG. 2 depicts a representative hardware environment of a computer system in accordance with a preferred embodiment of the present invention. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electromechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20.

A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk may have either dedicated disks which are encapsulated in an air tight case, or may have removable disks contained inside of plastic cartridges. For example, Iomega's JAZ™ 1 GB hard drive, Syquest's 1.5 GB SyJet™, and 1 GB SparQ™ hard drives all have removable hard disks.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid-crystal display. Those skilled in the art can thus appreciate that computer system 20 may be implemented as a notebook-based computer. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to direct the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc.

Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

FIG. 3 illustrates a pictorial representation of a prior art computer mouse 100. Computer mouse 100 is analogous to mouse 28 depicted in FIG. 1. A rigid shell 110 houses a mouse ball and electronics (not shown), and buttons 111 and 112, which allow a user to input signals to a computer system such as computer system 20 depicted in FIG. 1 and FIG. 2. Cable 120 connects mouse 100 to the computer or computer system.

Figure 4:
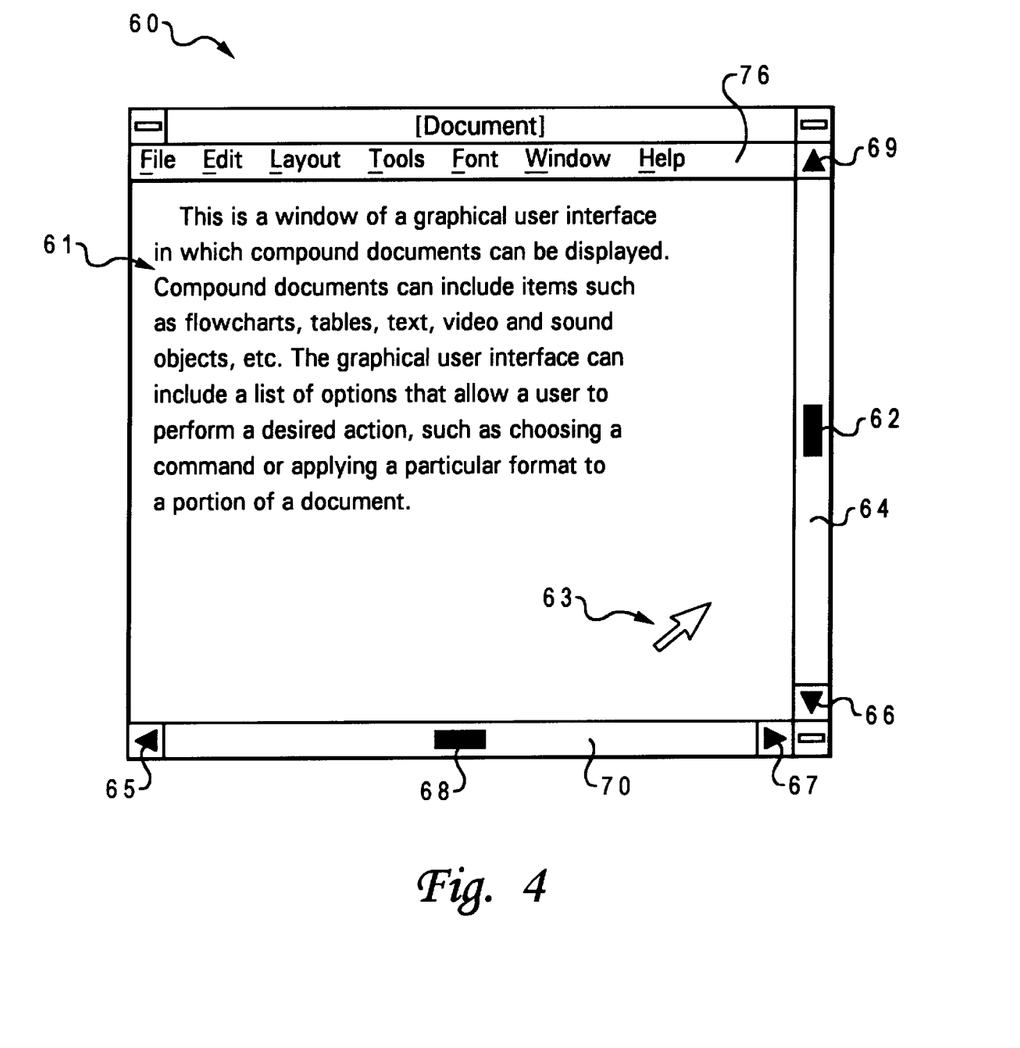
FIG. 4 depicts a pictorial representation of a graphical user interface window in accordance with the apparatus of the present invention.

FIG. 4 illustrates a pictorial representation of a graphical user interface window 60 in accordance with the apparatus of the present invention. Window 60 displays a portion of a viewable object, such as a compound document 61. Window 60 is an area on the display screen of a visual display device such as video display 24 of FIG. 1 that is utilized to present a view of an object or to conduct a dialog with a user. Such "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as compound document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a mouse pointer 63 over up-arrow 69 or down-arrow 66 of scroll bar 64 and "click" a button on a pointing device such as mouse 100 of FIG. 3 to scroll the document upward or downward, as appropriate. Scrolling in this manner permits viewing of any desired portion of compound document 61. Mouse pointer 63 is an on-screen element whose location changes as the user moves a mouse association with mouse pointer 63. Depending on the location of mouse pointer 63 on a display screen, and the operation of the program within which it is working, the area of the screen where mouse pointer 63 appears serves as the target for an action when the user presses one of the mouse buttons.

Thus, mouse pointer 63, utilized in association with a mouse, allows a user to scroll compound document 61 upward or downward. Scrolling is essentially the electronic equivalent of reading through a rolled (i.e., "scrolled") document rather than flipping through pages of a book. Scroll bar 64 is thus a graphical user interface window component, associated with a scrollable area, that indicates to a user that more information is available in a particular direction and can be scrolled into view. The graphical user interface window 60 sizes slider 62 within vertical scroll bar 64 according to the number of pages in compound document 61. Slider 62 is a vertical slider. The length of slider 62 is small with respect to the length of vertical scroll bar 64 because it represents one of many pages of compound document 61.

The graphical user interface which implements window 60, positions slider 62 within vertical scroll bar 64 relative to the viewable position of compound document 61. For example, the graphical user interface positions slider 62 at the top of vertical scroll bar 64 when the user is viewing the first page of compound document 61, and at the bottom of vertical scroll bar 64 when the user is viewing the last page of compound document 61. Slider 62, located on vertical scroll bar 64, is defined to have a minimum size.

Window 60 also contains a horizontal scroll bar 70 that may be activated either by mouse clicking on left arrow 65, right arrow 67, or by dragging slider 68 right or left. Slider 68 is analogous to slider 62. However, slider 68 operates in a horizontal direction, while slider 62 operates in a vertical direction. Similarly, vertical scroll bar 64 may be activated either by mouse clicking on up-arrow 69, down-arrow 66, or by dragging the vertical slider 62.

Figure 5:
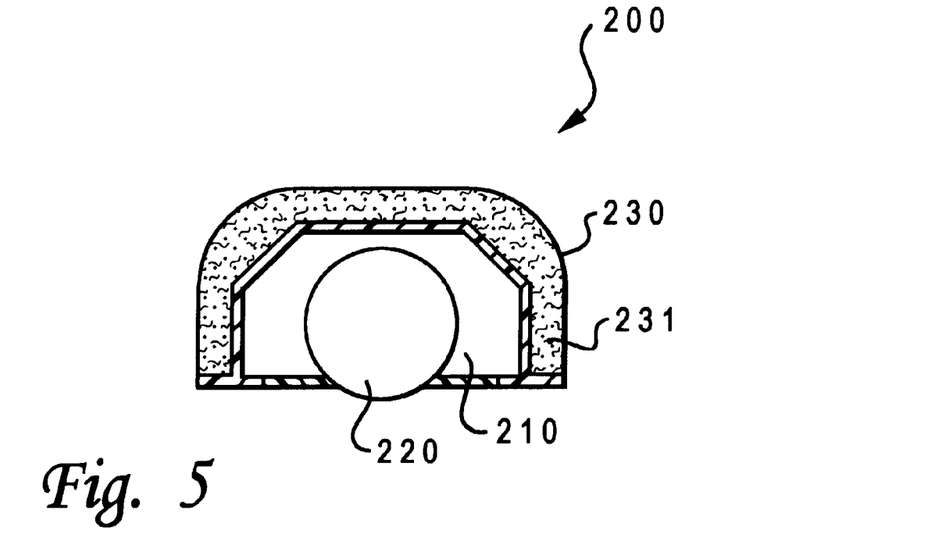
FIG. 5 illustrates a cross-sectional end-view of a gel-fitted mouse, in accordance with a preferred embodiment of the present invention.
Figure 6:
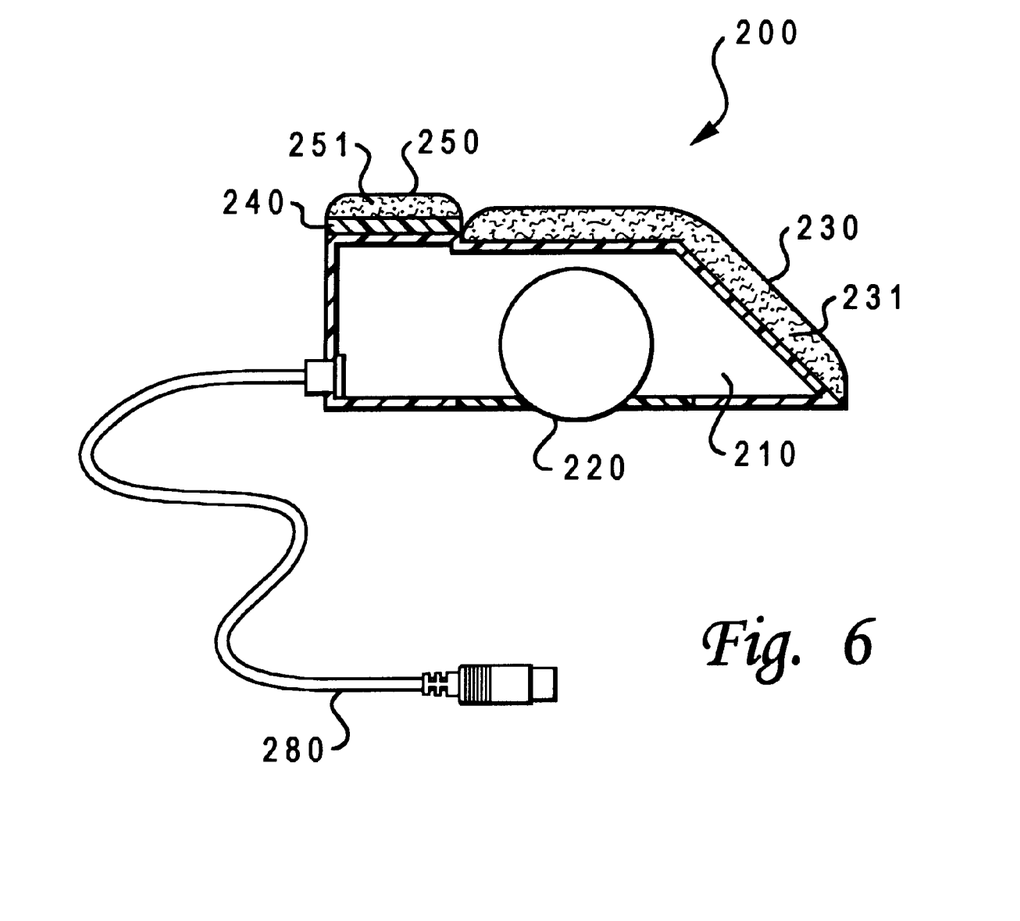
FIG. 6 depicts a cross-sectional side-view of the gel-fitted mouse of FIG. 5, in accordance with a preferred embodiment of the present invention.

FIG. 5 illustrates a cross-sectional end-view of a gel-fitted mouse 200, in accordance with a preferred embodiment of the present invention. FIG. 6 depicts a cross-sectional side-view of gel-fitted mouse 200 of FIG. 5, in accordance with a preferred embodiment of the present invention. In FIG. 5 and FIG. 6, like parts are indicated by identical reference numerals. Gel-fitted mouse 200 is similar to an ordinary mouse such as mouse 100 of FIG. 3 in that gel-fitted mouse 200 includes a mouse ball 220 and mouse buttons 240. However, the difference between mouse 100 of FIG. 3 and gel-fitted mouse 200 of FIG. 5 and FIG. 6 is that gel-fitted mouse 200 includes an interior shell 210 which keeps gel 231 from touching the interior electronics and mouse ball 220. Gel 231 is pliant and conforms to the shape of the mouse user's hands.

Although the interior electronics are not specifically depicted in FIG. 5 and FIG. 6, those skilled in the art will appreciate that such electronics include but are not limited to, a communications device located within the body of gel-fitted mouse 200 for communicating movement signals to a computer system (e.g., computer system 20 of FIG. 1 and FIG. 2), and a movement detection device located within the body of gel-fitted mouse 200, coupled to the communications device, for detecting movement of the body (i.e., gel-fitted mouse 200) by the mouse user. Gel-fitted mouse 200 is thus composed of a pliant outer shell having at least a portion (i.e., gel-fitted mouse 231) of the body of the mouse which dynamically conforms to the user's hand when gel-fitted mouse 200 is held and manipulated by the user, such that this portion of the body of gel-fitted mouse 200 provides comfort and efficient ergonomic cushioning to the user during computer system pointing device activities.

Mice may vary in shape and size; however, a gel of material such as silicone rubber (i.e., an elastomer) can always be utilized to implement gel 231 as pliant material. If rupture is a concern to the designer, or if extra durability is desired, the mouse may contain a membrane 230 over the gel. This outer surface may be smooth or texturized and may be antibacterial. Antibacterial materials, which are known to keep bacteria from joining and multiplying, may be implemented as such on an outer surface, in accordance with a preferred embodiment of the present invention. Buttons 240 of gel-fitted mouse 200 may be coated with a gel coating 251 layered beneath an exterior membrane 250. of course, the outer surface of gel-fitted mouse 200 may be antibacterial, regardless of whether the outer surface is a hard surface, a gel surface or an LCD (i.e., as described herein) surface.

Aside from normal mouse parts, gel 231 and gel coating 251 of gel-fitted mouse 200 may be composed of silicone oil, gel or elastomer polymers. The smallest unit of silicone (i.e., referred to as a "monomer") possesses a backbone of repeating silicon and oxygen atoms with methyl side groups. Monomers that are linked together form a chain. Chains may be short or long and linear or branched. Silicone oil consists of linear chains that have variable lengths. The viscosity of the oil increases proportional to the mean chain length. Silicone gel is made of long chains that have branches. Chain lengths in gels are often variable. The short chains resemble those of the oils, and the long chains resemble those of the elastomers.

Silicone elastomer is composed of long, branched chains that are lightly networked together. The networked elastomer can be thought of as a weave or cloth. The more networked the chains, the tighter the weave. Silicone elastomer is a very elastic, flexible material that may utilized to create a gel-coated mouse, such as gel-fitted mouse 200. To reduce the risk of the shorter chains of the gel diffusing through the elastomer shell, barrier coatings can be utilized to reduce the amount of gel bleed. Barrier coatings are placed either on the inner surface of the mouse shell (i.e., before the shell is filled with gel) or within the thickness of the shell. Both kinds of coating are made by replacing the methyl side groups of the silicone monomer with bulkier groups such as trifluoro or phenyl. The bulky side groups create a tighter "weave," so that the chains will not diffuse through the elastomer.

Mouse production processes may vary among manufacturers and product lines, however all processes possess similar basic steps. Mouse shells can be produced by repeatedly dipping a mandrel in a vat of dispersed silicone. Each dip of the mandrel creates a thin layer that is allowed to cure before redipping. Once the shell contains the desired thickness, the cured rubber is peeled off the mandrel and closed with a seal patch and adhesive. Gel mice are filled by the manufacturer. Gel is injected via a hypodermic needle through the seal patch. A button of adhesive is applied over the needle hole to seal the gel inside the rubber shell. The entire mouse shell and contents are then oven-cured to vulcanize the gel. Vulcanization changes the gel from a runny liquid to a firmer, more cohesive mass.

Mice may exist in various versions according to shell thickness and gel stiffness. The first category includes mice with thick shells (i.e., approximately 0.5 mm) and very cohesive (stiff) gel. However, if users are dissatisfied with the "feel" of this mouse, manufacturers may respond by producing softer mice. The second category includes mice with thinner shells (0.10 to 0.25 mm) and a more fluid gel. The mice have a natural feel, but may risk breaking while being utilized with great forces and around sharp objects. The third category includes mice of moderate thickness (i.e., approximately 0.3 mm), a more cohesive gel, and a barrier coating. Those skilled in the art will appreciate that other configurations are possible, including those with much thicker shells.

In an alternative preferred embodiment of the present invention, the fluid may be viscous and non-Newtonian, like Silly Putty™. Fluids of which the viscosity, or internal friction, must be taken into account are referred to commonly in the art as "viscous fluids," and are further distinguished as Newtonian fluids if the viscosity is constant for different rates of shear and does not change with time. The viscosity of non-Newtonian fluids either varies with the rate of shear or varies with time, although the rate of shear is constant. Fluids in a class in this last category that become thinner and less viscous as they continue to be stirred are called "thixotropic" fluids. Whatever the type of fluid utilized to construct a "gel-fitted" mouse, as described herein, for purposes of this disclosure, all such fluids are referred to generally as composing various types of gels.

An example of a non-Newtonian fluid preparation may be prepared as follows: First, ½ cup water is added to ½ cup of white glue. Next, 3 drops of food coloring are mixed and added to the ½ cup of water and the ½ cup of white glue. (In an alternate preferred embodiment of the present invention, the flexible outer layer of the gel-fitted mouse may be transparent, so users may in fact be able to view the coloring). Next, a borax solution is prepared by inserting in and stirring 2 tablespoons borax to 1 cup of water. ½ cup of the borax solution is then added to the water and glue mixture. Finally, this prepared non-Newtonian fluid preparation is added to the gel-fitted mousers fluid enclosure.

The gel may also be composed of electrorheological fluids. These type of fluids rapidly transform from a liquid to a solid and back to a liquid again by varying an electric field. On a microscopic level, electrorheological fluids appear suspensions of graphite particles in an oil. When the suspended particles are aligned, the fluid solidifies into a jellylike substance, and the effect can be turned "on" and "off" more than a thousand times per second. The purposes of electrorheological fluids are many. For example, such fluids can be utilized for shock absorption, lubrication, cooling, and so forth. In an alternative preferred embodiment of the present invention, an electrorheological fluid can be utilized as a comfort feature for a user's hand (i.e., when the user grasps the mouse), and also to provide feedback to the user. For example, sudden increases in viscosity, or pulsating increases and decreases, can alert users to warning conditions of application software. Cable 280 connects the gel-fitted mouse to the host personal computer, and enables the electrical commands necessary for tactile feedback to be sent from the host personal computer to the mouse.

The fluid viscosity may be controlled by software running on the host personal computer, the host personal computer operation system, a web browser receiving information via a computer network, or by particular data communicated to the gel-fitted mouse via cable 280 from the computer network. The fluid control parameters may be stored on a hard disk or in an EPROM (i.e., erasable programmable read-only memory) of the host computer. These fluid control parameters may be utilized to control the electrorheological fluid with various excitations, such as pulse-width modulation (PWM), square wave, triangular wave, or sinusoidal excitation. Such fluid control parameters may also vary with the time of day. Those skilled in the art will appreciate that this fluid viscosity control possesses applications other than selection devices (e.g., mice, joysticks, etc.). Such fluid viscosity control may be applied to any tactile feedback device worn anywhere on a user's body (e.g., silent, tactile pagers).

Figure 7:
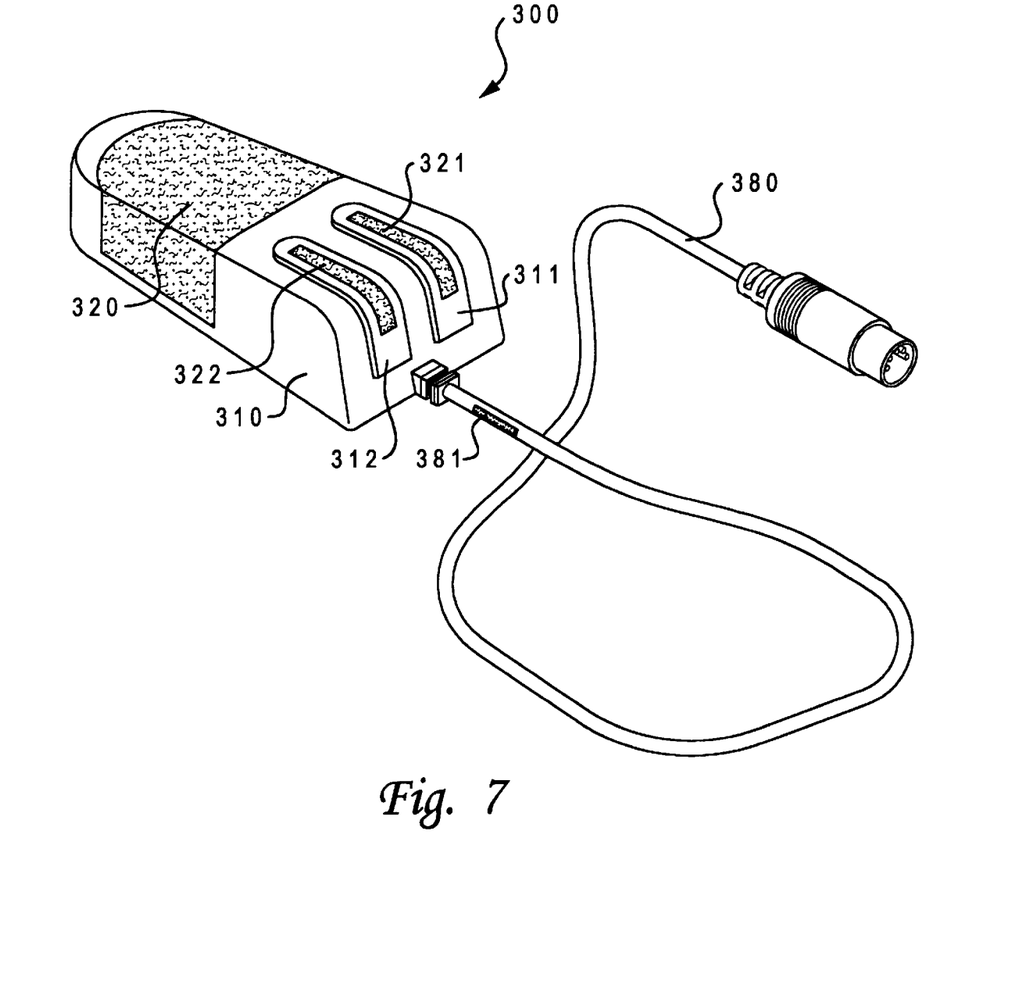
FIG. 7 illustrates a pictorial representation of a mouse having a liquid-crystal display, in accordance with an alternative preferred embodiment of the present invention.

FIG. 7 illustrates a pictorial representation of a mouse 300 having a liquid-crystal display, in accordance with an alternative preferred embodiment of the present invention. Mouse 300 can be referred to as a "liquid-crystal" mouse, and includes a liquid-crystal plate 320 attached to a rigid outer shell 310. Smaller liquid-crystal plates 321 and 322 are respectively attached to buttons 311 and 312. Cable 380 connects liquid-crystal mouse 300 to a host personal computer. Cable 380 is analogous to cable 280 of FIG. 6. Simple touching of the liquid-crystal plates by the user results in the plates changing color, which might be appealing to those users who wish to operate personal computers which are less "digital" and increasingly "user-friendly" in nature. Such a technique may be referred to as "passive" coloration.

The liquid-crystal plates can be "actively" controlled by the host personal computer, so that the colors themselves may be changed by the host personal computer, which may, for example, enable the host personal computer to signal voice users when mouse input is expected via cable 380. Alternately, the color of the liquid-crystal can be altered based on an electric circuit controlled by the host, as a means of alerting the user to incoming messages while the display unit utilized by the computer system is operating in a "screen-saver" mode. Such a color change may include "blinking," particularly when the host personal computer is expecting input from the user. An optional liquid-crystal plate 381 may be positioned on a portion of cable 380 to provide liquid-crystal visual feedback to the user via cable 380, when the body of liquid-crystal mouse 300, including liquid-crystal plates 321 and 322, is hidden from view by the user's hand. Liquid-crystal plate 381 may also extend across the entire length of cable 380, depending on a particular implementation.

Those skilled in the art will appreciate that such an alternative preferred embodiment of the present invention, presents the user a "user-friendly" device for allowing new personal computer users to interact with a mouse. Those skilled in the art will also appreciate that the tip of a trackpoint device can similarly be coated with a liquid-crystal responsive to signals from the processor of a "laptop" or "notebook" computer. A trackpoint device is a pointing device utilized chiefly with portable laptop computers. One type of pointing device that may be utilized in association with a preferred or alternative preferred embodiment of the present invention is the IBM TrackPoint II™.

Those skilled in the art will additionally appreciate that other coating materials may be utilized in association with a preferred embodiment of the present invention. For example, the mouse may be coated with PDF (Polyurethane Density Foam) as an alternative to the gel coating described herein. PDF is a simpler implementation of the general concept described herein. PDF is the resilient foam utilized to make squeeze toys/balls, relaxers, and so forth. The squeezing of the porous foam results in squeezing air out from it. Releasing the porous film results in air being sucked back into it, which allows it to return to its original shape.

Those skilled in the art will further appreciate that a variety of potential embodiments of the present invention may be implemented. For example, if the buttons of the gel-fitted mouse are gel-coated, the gel can change its electrorheological property to signify tactile feedback to the user when the button is "clicked." Alternately, the buttons can be coated with liquid-crystal such that the buttons change colors when "clicked." Such a color changing may be useful for young computer users. In addition, the apparatus described herein may be applied to devices other than pointing devices. For example, such an apparatus may be applied to the handset of a telephone to provide additional comfort, or to other hand-held or pressed computer peripherals including, but not limited to, joysticks, trackballs, keyboard keys, and so forth. Those skilled in the art will further appreciate that other potential implementations of a preferred embodiment include both wireless and wireline or cable-based pointing devices.

Based on the disclosure provided herein, it can be appreciated that two potential preferred embodiments may be implemented. One preferred embodiment that may be implemented is the "gel-fitted mouse" described herein. Another preferred embodiment that may be implemented according to the disclosure describe herein is "mood mouse," reminiscent of the liquid-crystal "mood-rings" of the 1970s. The gel-fitted mouse and the liquid-crystal mouse described herein each have a passive component and an active component. In the passive component of the gel-fitted mouse, the gel functions as an ergonomic aid to the user's body. In the active component of the gel-fitted mouse, the electrorheological fluid changes properties based on computer input, thus providing a form of tactile feedback. Similarly, in the passive component of the liquid-crystal mouse, the liquid-crystal material changes colors due to the temperature and/or pressure of the user's hand. In the active component of the liquid-crystal mouse, the computer triggers color changes in the liquid-crystal mouse.

Thus, while the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A hand held pointing device for use with a computer system having a graphic interface, said pointing device comprising:

a body;

communication means within said body for communicating movement signals to said computer system;

movement detection means within said body, coupled to said communication means, for detecting movement of said body by a user;

a pliant outer shell comprising at least a portion of said body which dynamically conforms to a user's hand when said pointing device is held and manipulated by a user, such that said portion of said body provides comfort and efficient ergonomic cushioning to said user during computer system pointing device activities; and a liquid-crystal layer attached to said pliant outer shell, wherein said liquid-crystal layer changes colors to provide visual feedback, in response to the temperature or pressure of a user's hand.

2. The pointing device of claim 1 wherein said body further comprises at least one user input means for transferring data to said computer system via said pointing device.

3. The pointing device of claim 2 further comprising an interior shell which prevents said portion of said body from contacting interior electronics located within said pointing device.

4. The pointing device of claim 3 wherein said pliant outer shell is surrounded by a membrane for preventing rupture of said portion of said body.

5. The pointing device of claim 2 wherein said pliant outer shell includes an antibacterial outer surface.

6. The pointing device of claim 1 wherein said liquid-crystal layer changes colors to provide visual feedback, in response to computer signals communicated from said computer system.

7. The pointing device of claim 6 further comprising a cable coupled to said pointing device and said computer system for transferring between said pointing device and said computer system.

8. The pointing device of claim 7 wherein said cable further comprises a liquid-crystal layer attached to said cable, wherein said liquid-crystal layer changes colors to provide visual feedback, in response to the temperature or pressure of a user's hand.

9. The pointing device of claim 7 wherein said cable further comprises a liquid-crystal layer attached to said cable, wherein said liquid-crystal layer changes colors to provide visual feedback, in response to particular computer signals generated by said computer system.

10. The pointing device of claim 1 wherein said pliant outer shell contains an electrorheological fluid.

11. The pointing device of claim 10 wherein said electrorheological fluid comprises an electrorheological fluid having a viscosity that changes to provide tactile feedback, in response to particular computer signals generated by said computer system.

12. A hand held pointing device for use with a computer system having a graphic interface, said pointing device comprising:

a body;

communication means within said body for communicating movement signals to said computer system;

movement detection means within said body, coupled to said communication means, for detecting movement of said body by a user; and an outer shell having a liquid-crystal layer attached to said outer shell, wherein said liquid-crystal layer dynamically changes colors to provide visual feedback, in response to the temperature or pressure of said user's hand.

13. The pointing device of claim 12 wherein said liquid-crystal layer further comprises a liquid crystal layer that dynamically changes colors to provide visual feedback, in response to particular computer signals generated by said computer system.

14. The pointing device of claim 13 further comprising a cable coupled to said pointing device and said computer system for transferring communication signals between said pointing device and said computer system.

15. The pointing device of claim 14 wherein said cable further comprises a liquid-crystal layer attached to said cable, wherein said liquid-crystal layer dynamically changes colors to provide visual feedback, in response to the temperature or pressure of a user's hand.

16. The pointing device of claim 14 wherein said cable further comprises a liquid-crystal layer attached to said cable, wherein said liquid-crystal layer dynamically changes colors to provide visual feedback, in response to particular computer signals generated by said computer system.

* * * * *